United States Patent
Abali et al.

(10) Patent No.: US 11,586,266 B1
(45) Date of Patent: Feb. 21, 2023

(54) PERSISTENT POWER ENABLED ON-CHIP DATA PROCESSOR

(71) Applicant: INTERNATIONAL BUSINESS MACHINES CORPORATION, Armonk, NY (US)

(72) Inventors: Bulent Abali, Yorktown Heights, NY (US); Alper Buyuktosunoglu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/443,910

(22) Filed: Jul. 28, 2021

(51) Int. Cl.
G06F 1/26 (2006.01)
G06F 1/28 (2006.01)
G06F 1/30 (2006.01)
G06F 12/0804 (2016.01)

(52) U.S. Cl.
CPC .............. *G06F 1/305* (2013.01); *G06F 1/263* (2013.01); *G06F 1/28* (2013.01); *G06F 12/0804* (2013.01); *G06F 2212/1032* (2013.01)

(58) Field of Classification Search
CPC ................ G06F 1/28; G06F 1/30; G06F 1/305
See application file for complete search history.

(56) References Cited

U.S. PATENT DOCUMENTS

| | | | |
|---|---|---|---|
| 5,799,200 A | 8/1998 | Brant | |
| 7,990,797 B2 | 8/2011 | Moshayedi | |
| 8,190,822 B2 * | 5/2012 | Iida | G06F 11/1441 711/126 |
| 9,851,990 B2 | 12/2017 | Ayanam | |
| 10,817,502 B2 | 10/2020 | Talagala | |
| 2018/0157301 A1 * | 6/2018 | Koger | G06F 13/4282 |

FOREIGN PATENT DOCUMENTS

WO 2013016723 A2 1/2013

OTHER PUBLICATIONS

Mehra, Pankaj et al., "Fast and Flexible Persistance: The Magic Potion for Fault-Tolerance, Scalability and Performance in Online Data Stores", IPDPS 2004 (p. 9).

Shantharama, Prateek et al., "Hardware-Accelerated Platforms and Infrastructures for Network Functions: A Survey of Enabling Technologies and Research Studies", IEEE, Jul. 29, 2020 (p. 65).

Gupta, Vishal et al., "HeteroVisor: Exploiting Resource Heterogeneity to Enhance the Elasticity of Cloud Platforms", VEE ' 15, Mar. 14-15, 2015, Turkey, (p. 14).

Anonymous, "The Method and Apparatus for Saving the Common Volatile Data in Multiple Subsystems Across Reset Reloads", IPCOM000243747D Oct. 16, 2015, (p. 4).

Anonymous, "Two-tier Main Memory Subsystem and its Management", IPCOM000224156D, Dec. 11, 2012, (p. 5).

(Continued)

*Primary Examiner* — Mark A Connolly
(74) *Attorney, Agent, or Firm* — Griffiths & Seaton PLLC (57) ABSTRACT

Data may be transferred from a volatile memory to a non-volatile memory using a persistent power enabled on-chip data processor upon detecting a power loss from a primary power source. The one or more emergency power supplies are attached to the volatile memory, the non-volatile memory, and the persistent power enabled on-chip data processor to assist with the transferring of data.

18 Claims, 8 Drawing Sheets

(56) References Cited

OTHER PUBLICATIONS

Anonymous, "Voltage Stacking for Inherent Power Supply Down Conversion in Memory Subsystem", IPCOM000199688D, Sep. 14, 2010, (p. 5).

Amidi, Mike, "iVDIMM—World First Intelligent Memory Module Handle Big Data Faster by Combining Memory and Compute", Flash Memory Summit 2017, Santa Clara, CA (p. 14) https://www.flashmemorysummit.com/English/Collaterals/Proceedings/2017/20170810_S301 C_Amadi.pdf.

* cited by examiner

PERSISTENT POWER ENABLED ON-CHIP DATA PROCESSOR

BACKGROUND

The present invention relates in general to computing systems, and more particularly, to various embodiments for implementing a persistent power enabled on-chip data processor in the event of a power loss in a computing environment using a computing processor.

SUMMARY

According to an embodiment of the present invention, a method for using a persistent power enabled on-chip data processor in the event of a power loss in a computing environment, by one or more processors, is depicted. Data may be transferred from a volatile memory to a non-volatile memory using a persistent power enabled on-chip data processor upon detecting a power loss from a primary power source. The one or more emergency power supplies are attached to the volatile memory, the non-volatile memory, and the persistent power enabled on-chip data processor to assist with the transferring of data.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

The present invention relates generally to the field of data storage, and more specifically, to implementing and using a persistent power enabled on-chip data processor using an energy power domain to copy and transfer data upon a loss of power from a primary power source in a computing environment and the like.

In many instances, data may be stored to a data storage system, or at least to be processed using one of the resources. A power loss to the host system can result in the data being at least temporarily stored in volatile memory, meaning that the data can be lost in the event of a power failure or other such event. In the event of a power loss, a memory module of the type including both volatile and nonvolatile memory has been developed to mitigate or reduce data loss. Memory modules of this type are generally referred to as nonvolatile DIMMs (NVDIMMs). However, NVDIMM (e.g., a battery backed dynamic random access memory "DRAM" dual in-line memory module "DIMM") may not be available on some storage or DBMS systems and require large and bulky batteries. Thus, a power loss from a primary power supply source may result in complete or partial loss of data such as, for example, a power loss will cause most of the data in the volatile memory to be lost. Additionally, storage class memory ("SCM") systems have been used to address some challenges to the NVDIMM but the SCM encounters many challenges in the storage controller application such as, for example, performance, connectivity, reliability, and licensing challenges.

Accordingly, various embodiments are provided for implanting a non-volatile storage ("NVS") in a processor chip with the assistance of short-lived emergency power sources such as, for example, supercapacitors. That is, a persistent power enabled on-chip data may be implemented and used having an independent power supply. Data may be transferred from a volatile memory to a non-volatile memory using a persistence engine ("PE") (e.g., a persistent power enabled on-chip data processor or contained thereon) upon detecting a power loss from a primary power source. The one or more emergency power supplies are attached to the volatile memory, the non-volatile memory, and the persistent power enabled on-chip data processor to assist with the transferring of data.

In one aspect, the one or more emergency power supplies may be a small form factor supercapacitor or a battery to supply temporary power to a persistence Engine ("PE") on chip (e.g., a shadow or standalone processor). The one or more emergency power supplies keeps alive a portion of the processor chip containing the persistence engine, and a portion of dynamic random access memory ("DRAM") when a power fail occurs.

In one aspect, the persistence engine may make copies of the volatile memory (e.g., a DRAM) contents through a one or more peripheral component interconnect express ("PCIe") to an external non-volatile memory when power fails, or when machine-check occurs. One or more architected instructions may be provided to the persistence engine declaring and identify regions of DRAM as to be "non-volatile" and may perform a point time snapshot of DRAM contents. Also, instructions may be provided to the PE for flushing layer 1/layer3 (e.g., "L1/L3") contents to harden the data in a pseudo-NVS in DRAM.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
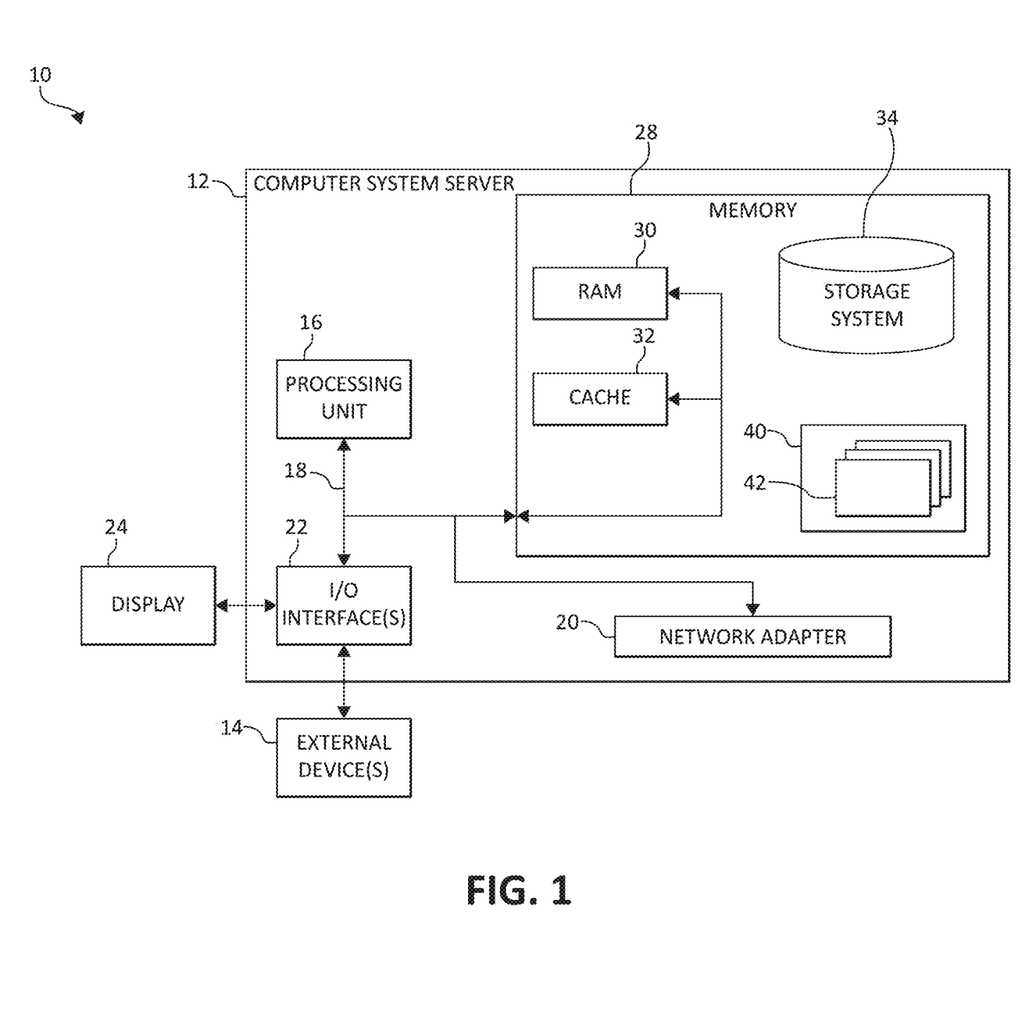
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
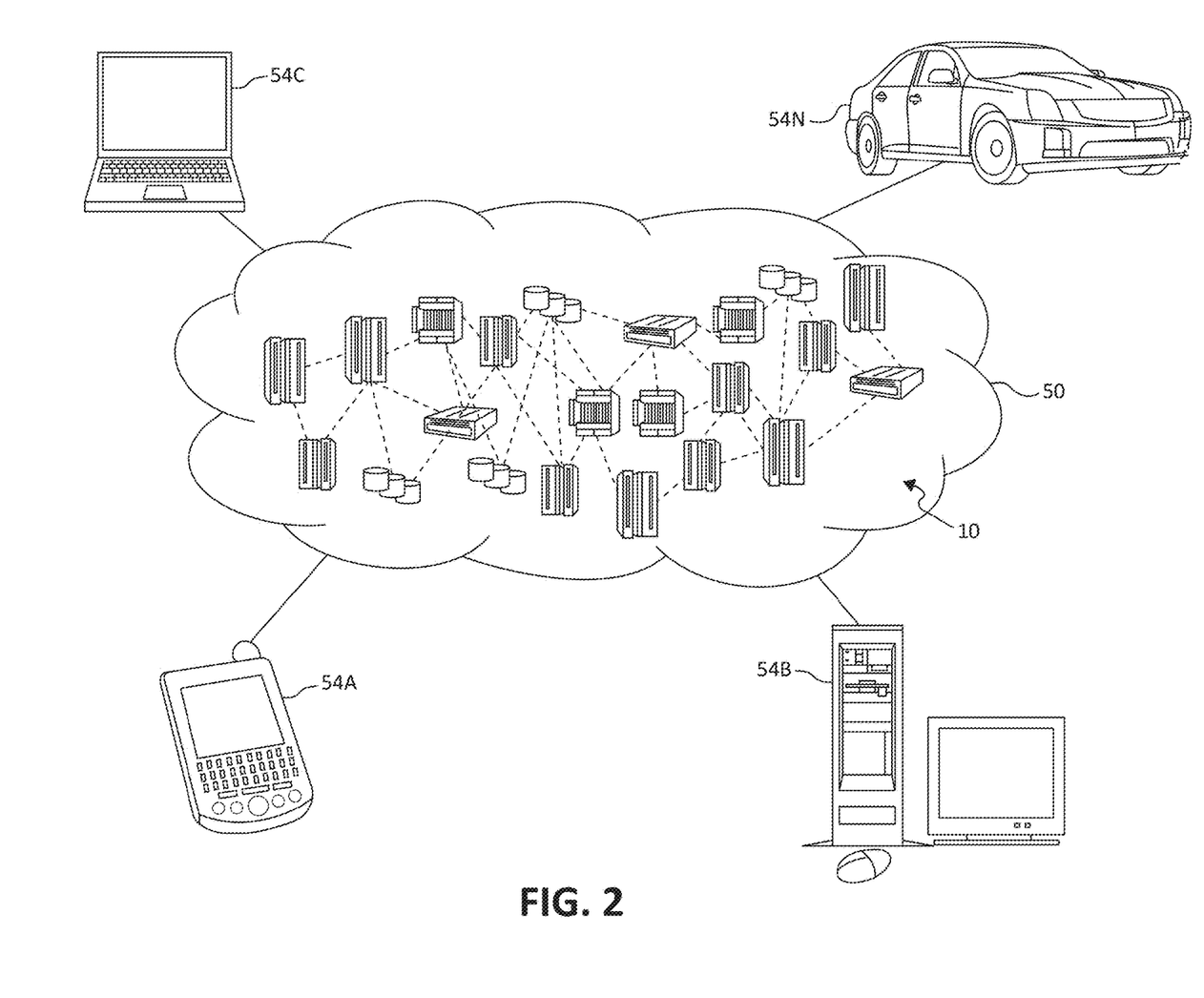
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
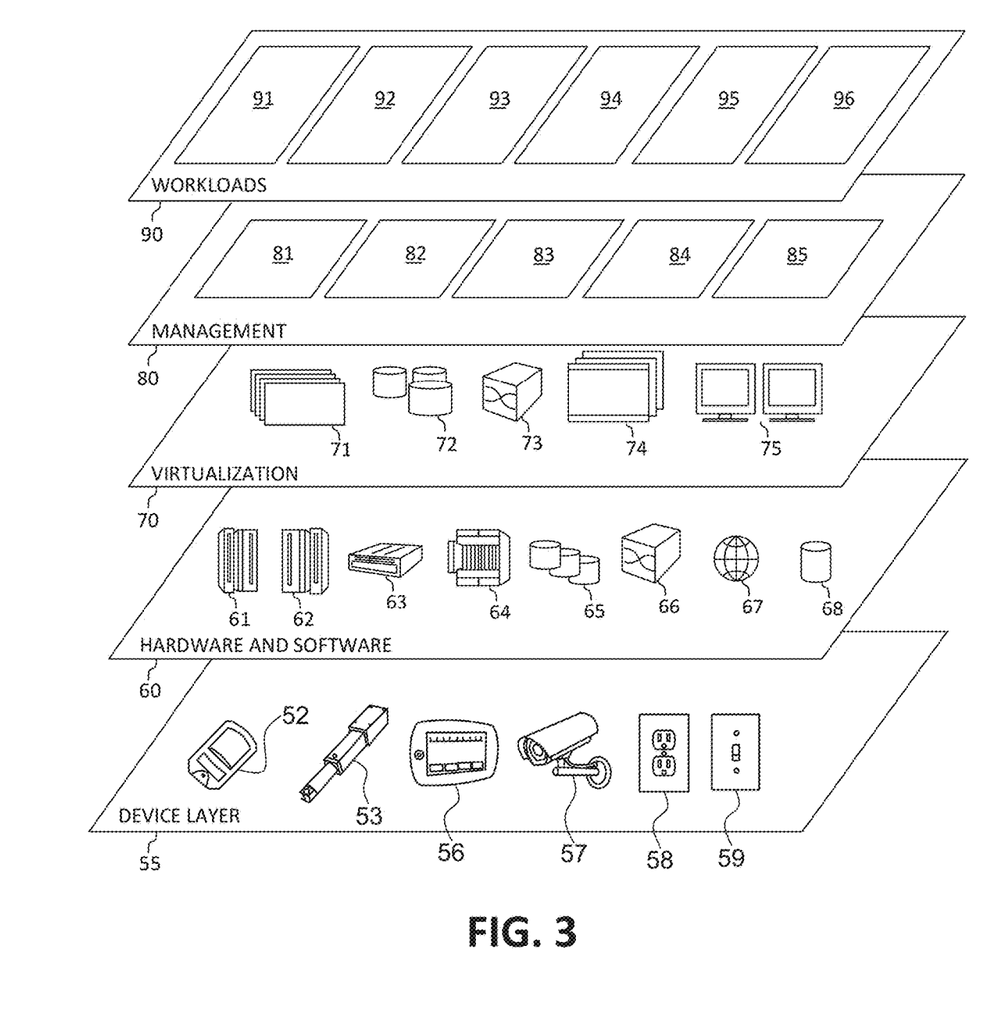
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing and using a persistent power enabled on-chip data processor in a computing environment (e.g., in a neural network architecture). In addition, workloads and functions 96 for implementing and using a persistent power enabled on-chip data processor in a computing environment may include such operations as analytics, deep learning, and as will be further described, user and device management functions. One of ordinary skill in the art will appreciate that the workloads and functions 96 for implementing and using a persistent power enabled on-chip data processor in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for implementing and using a persistent power enabled on-chip data processor in a computing environment by one or more processors in a computing system. Data may be transferred from a volatile memory to a non-volatile memory using a persistent power enabled on-chip data processor upon detecting a power loss from a primary power source. The one or more emergency power supplies are attached to the volatile memory, the non-volatile memory, and the persistent power enabled on-chip data processor to assist with the transferring of data.

Figure 4A:
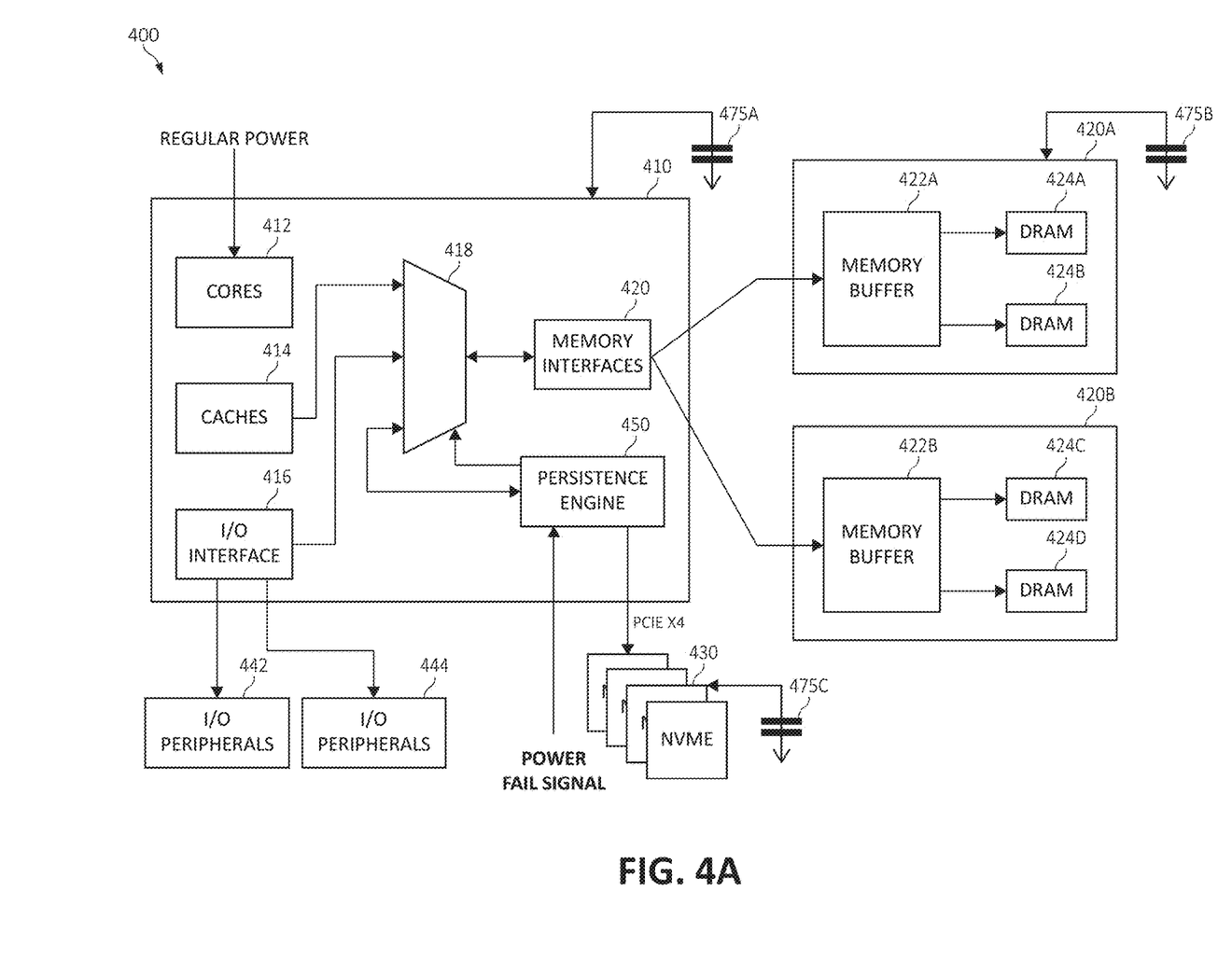
FIGS. 4A-4C are block diagrams depicting an exemplary functional relationship between various aspects of the present invention.
Figure 4B:
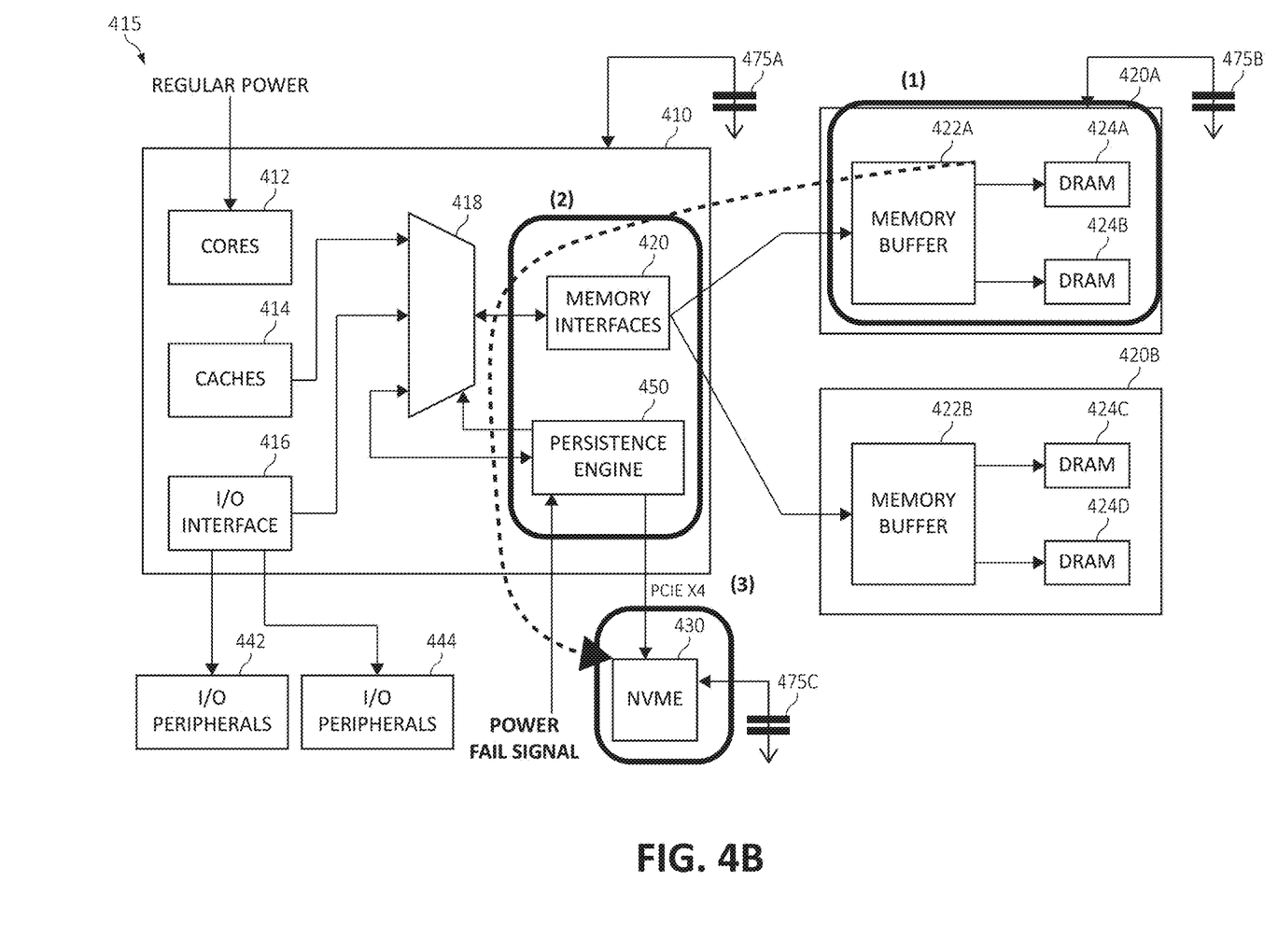
Figure 4C:
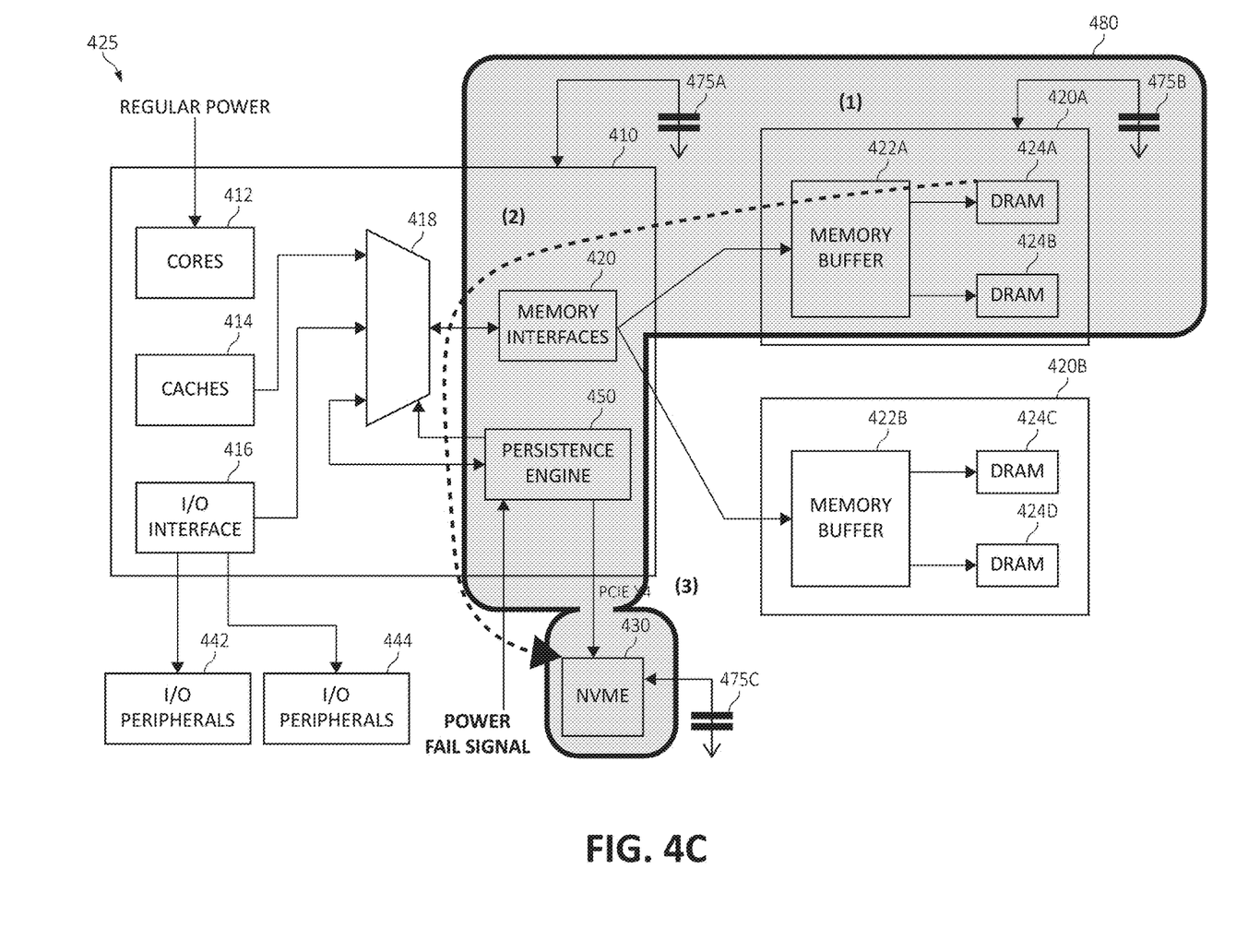

Turning now to FIGS. 4A-4C, are block diagram depicting exemplary functional components of system 400 for implementing and using a persistent power enabled on-chip data processor in a computing environment according to various mechanisms of the illustrated embodiments is shown. In one aspect, one or more of the components, modules, services, applications, and/or functions described in FIGS. 1-3 may be used in FIGS. 4A-4C. As will be seen, many of the functional blocks may also be considered "modules" or "components" of functionality, in the same descriptive sense as has been previously described in FIGS. 1-3.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

A host system 410 is shown, incorporating cores 412, caches 414, an Input/Output ("I/O") interface 416 in communication with I/O peripherals 442 and 444, memory interfaces 420, and a persistence engine 450 (e.g., a persistent power enabled on-chip data processor 450 to perform various computational, data processing and other functionality in accordance with various aspects of the present invention. In one aspect, the persistence engine 450 is in communication with or attached to to a non-volatile memory subsystem 430 (or non-volatile memory), which is shown in FIGS. 4A-4C as non-volatile memory express ("NVMe") for accessing non-volatile storage media. In one aspect, the persistence engine 450 may be an RISC-V processor included on a processor chip that may be a shadow processor or standalone processor.

The persistence engine 450 may also be in communication with or attached to a volatile memory subsystem 420A and/or 420B. As depicted, by way of example only, the volatile memory subsystem 420A and/or 420B include a memory buffer 422A and 422B, respectively, each of which may in in communication or attached to a volatile memory such as, for example, dynamic random access memory ("DRAM") 424A-424D.

Although a regular power supply is provided to the host 410 (not shown but merely referenced for illustrative convenience), an emergency power supply 475A is also coupled or attached to the host 410. More specifically, an emergency power supply ("EPS") is provided to supply temporary power in the event the primary power supply fails to provide sufficient power or a complete power failure. In one aspect, the EPS may include emergency power supplies 475A-C. The EPS such as, for example, the emergency power supplies 475A-C keeps "alive" a portion of the host system 410 (e.g., a CPU) such as, for example, the persistence engine 450 (which may be located on a chip) in the event a portion of the host system 410 or the volatile memory subsystem 420A and/or 420B power fails.

The persistence engine 450 may use the emergency power supply 475A as its own emergency power supply and the emergency power supply 475A supplies power to selected regions of the host system 410.

Also, emergency power supply 475B is coupled or attached to the volatile memory subsystem 420A. It should be noted that the volatile memory subsystem 420B may also have an emergency power supply, but is shown in FIGS. 4A-4C without such an emergency power supply. Also, an emergency power supply 475C is coupled or attached to the non-volatile memory subsystem 430.

Thus, the system 400 implements the persistence engine 450 on the host system 410 using external commodity parts such as, for example, the non-volatile memory subsystem 430 (e.g., NVMe), the volatile memory subsystem 420A and/or 420B (e.g., DRAM), and the emergency power supplies 475A-C, which may be supercapacitors or batteries. In one aspect, the persistence engine 450 may be a persistent power enabled on-chip and may copy and transfer contents of a designated region (e.g., a designated DRAM region) of the volatile memory subsystem 420A and/or 420B and may transfer the contents of the designated region to the to the non-volatile memory subsystem 430 (e.g., to the NVMe) when power fails such as, when a primary power source fails. That is, the designated region (e.g., a designated DRAM region) of the volatile memory subsystem 420A and/or 420B and the designated region to the to the non-volatile memory subsystem 430 are powered by the emergency power supplies such as, for example, the emergency power supply 475B to enable the processing, copying, encrypting, and transferring of the data.

The persistence engine 450 may process data such as, for example, compressing, encrypting, and transforming data configurations, keys, critical data, and selected processor state information from volatile memory such as, for example, the volatile memory subsystem 420A. The persistence engine 450 may transfer the processed data to non-volatile memory subsystem 430 using power provided by the emergency power source such as, for example, the emergency power supply 475A upon a primary power source becoming unavailable. In one aspect, the persistence engine 450 may begin to copy and transfer the data based on a signal received externally or on a command received from the host system 410. Also, the persistence engine 450 may include with the data transfer a processor state per command received from the host system 410.

In one aspect, the persistence engine 450 and the memory interfaces 420 and the non-volatile memory subsystem 430 (e.g., NVMe interfaces to non-volatile memory) may collectively be referred to as an energy power domain ("EPD"). Also, the emergency power source such as, for example, the emergency power supply 475A-C maintains power to the collective energy power domain for a period of time such as, for example, tens of seconds when the main or primary power fails.

The emergency power source such as, for example, the emergency power supply 475A-C may be a battery or a supercapacitor. The emergency power source such as, for example, the emergency power supply 475A-C may be used for dumping volatile memory contents of the volatile memory subsystem 420A and/or 420B to the non-volatile memory subsystem 430. In one aspect, based on design preferences and configuration, the non-volatile memory subsystem 430 may be a 64 gigabyte ("GB") memory with at least 4 PCIe NVMe devices (e.g., "PCIe x4 NVMe" device) for transferring the data in less than 30 seconds. Alternatively, with data compression and up to 16 PCIe NVMe devices much shorter copy and transfer times are possible.

For further explanation, FIGS. 4B and 4C depict process flows for using the EPS to provide transfer data in the event of a primary power source failure. As a preliminary matter, upon receiving a power fail signal, a portion of the energy power domain 480 on the host system 410 such as, for example, the persistence engine 450 and the memory interfaces 420 receive power from the emergency power supply 475A and remain alive and active for a period of time such as, for example, tens of seconds on the power fail. The emergency power supply 475B may also provide power to the volatile memory subsystem 420A to also remain alive and active for a period of time. The emergency power supply 475C provides power to the non-volatile memory subsystem 430 to also remain alive and active for a period of time to enable the data transfer.

In one aspect, as illustrated in FIGS. 4B-4C, the persistence engine 450, the memory interfaces 420, the volatile memory subsystem such as, for example, the volatile memory subsystem 420A, and the non-volatile memory subsystem 430 may be collectively referred to as the emergency power domain 480. Thus, despite a power loss from a primary power source, the emergency power supplies 475A-C provides power and keeps "alive" the persistence engine 450, and the volatile memory subsystem 420A to enable copying and transferring data in the emergency power domain 480 to the non-volatile memory subsystem 430, as described herein.

In step 1, the persistence engine 450 may access and copy designated region (e.g., a designated DRAM region) of the volatile memory such as, for example, the volatile memory subsystem 420A. In step 2, the persistence engine 450 may process the copied data such as, for example, by encrypting the data contents. In step3, the persistence engine 450 may transfer the contents of the designated region to the non-volatile memory subsystem 430 (e.g., to the NVMe) when power fails and the non-volatile memory subsystem 430 saves the transferred data. The persistence engine 450 may also write the data to additional, external targets for providing additional reliability, availability and serviceability ("RAS"), meaning chances of losing data is minimized due to component and system failures other than power failures. In this way, the non-volatile memory subsystem 430 may be remote to the host system 410 making the embodiments advantageous of the current state of the art since non-volatile memory is natively implemented in a processor chip of the host system and the non-volatile memory subsystem 430 functions the same as the volatile memory subsystem 420A.

Figure 4D:
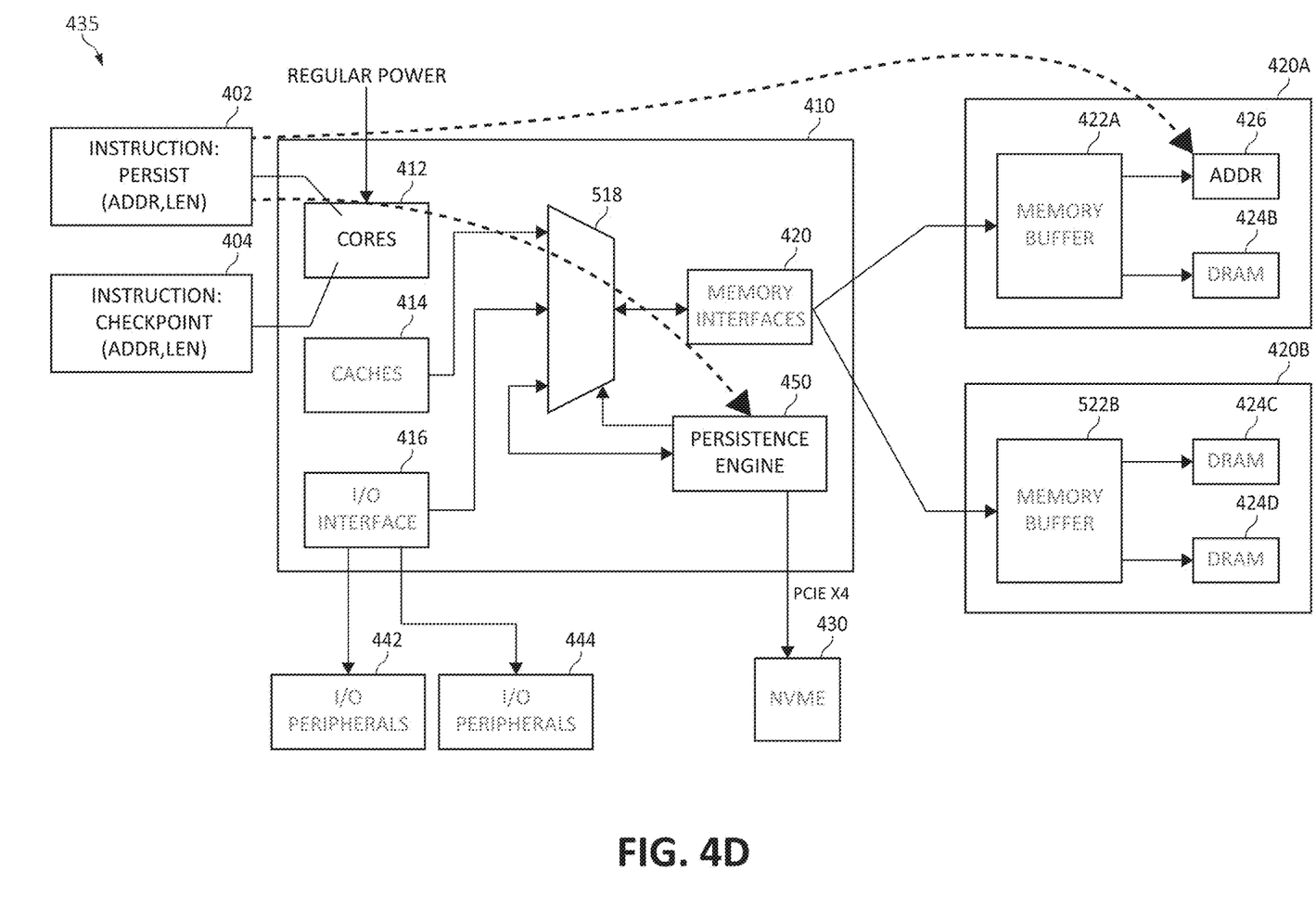
FIG. 4D is a block flow diagram depicting operations for implementing and using a persistent power enabled on-chip data processor in the event of a power loss in a computing environment according to an embodiment of the present invention.

Turning now to FIG. 4D, block diagram depicts exemplary operations 425 for implementing and using a persistent power enabled on-chip data using application instructions for declaring non-volatile regions in the volatile memory in a computing environment. In one aspect, the persistence engine 450 may be an independent computing device (e.g., a microprocessor having its own instruction set architecture ("ISA"). For example, the persistence engine 450 may be an RISC-V processor. The non-volatile memory subsystem 430 may be an NVMe and may be a PCIe flash M2 form factor card on a server motherboard. The persistence engine 450 may include one or more PCIe links and one or more NVMe cards for redundancy. Each of the PCIe link of the persistence engine 450 may connect to a network card or to a PCIe bridge associated with the non-volatile memory subsystem 430.

In one aspect, a first set of instructions 402 and a second set of instructions may be provided by the core(s) 412 to declare and indicate their own non-volatile regions in the volatile memory subsystem 420A. For example, the instruction 402 may indicate the address 426 ("ADDR") and length ("LEN) of the data in the volatile memory subsystem 420A, which may be provided to the persistence engine 450. The first set of instructions 402 may be a persist instruction to declare and indicate a memory region such as, for example, at ADDR 426 that is to be copied and transferred from the volatile memory subsystem 420A to the non-volatile memory subsystem 430. A second set of instructions 404, again, may be provided by the core(s) 412 and indicates a point in time copy of memory to the non-volatile memory subsystem 430 and does not required waiting on a power failure.

Thus, the persistence engine 450 may access the identified and declared memory region such as, for example, the ADDR 426 and copy the data contents. The persistence engine 450 may process the data and may encrypt the day to secure the data contents. The persistence engine 450 may transfer the data to the non-volatile memory subsystem 430 to protect against the power failure of the host system 410. In one aspect, the persistence engine 450 may one of the existing processor cores such as, for example, cores 412 also functions independently by receiving a persistent power-supply from the emergency power supply 475A.

In some embodiments, the persistence engine 450 may be applied to various types of applications. For example, PERSIST(addr, len), UNPERSIST(addr, len) architected processor instructions may provide a communication API between the software applications and the persistence engine 450. In this way, selected memory regions are enabled/allowed to be declared as non-volatile during software application execution. In some embodiment, in addition to storage code, various other types of software application such as, for example, a database and filesystems, which rely on non-volatile storage, can exploit this capability of once implemented as part of the processor ISA. Also, a CHECKPOINT and ROLLBACK architected instructions may exchange DRAM and NVMe contents, instantaneously. The CHECKPOINT and ROLLBACK architected instructions may be used for reliability, availability, and storage high functions such as taking a snapshot of memory contents.

Figure 5:
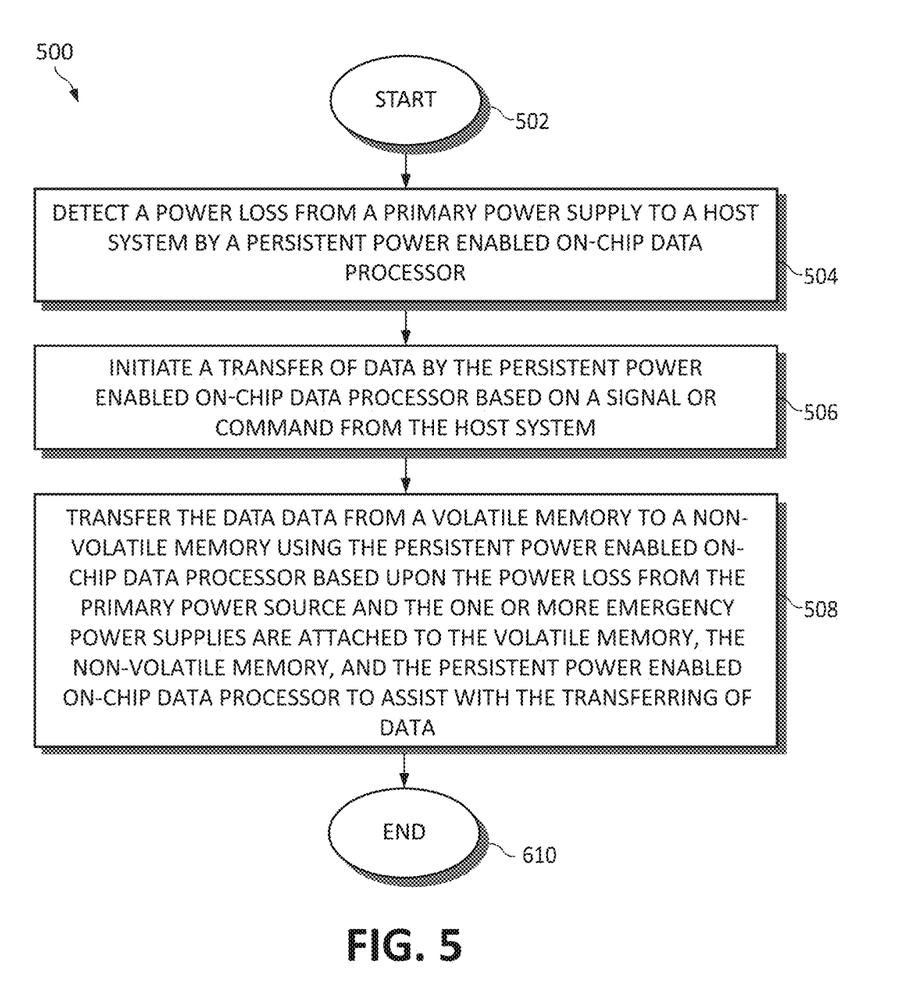
FIG. 5 is a flowchart diagram depicting an exemplary method for implementing and using a persistent power enabled on-chip data processor in the event of a power loss in a computing environment, by a processor, in which aspects of the present invention may be realized.

Turning now to FIG. 5, a method 500 for using a persistent power enabled on-chip data processor in a computing environment using a processor is depicted, in which various aspects of the illustrated embodiments may be implemented. The functionality 500 may be implemented as a method (e.g., a computer-implemented method) executed as instructions on a machine, where the instructions are included on at least one computer readable medium or one non-transitory machine-readable storage medium. The functionality 500 may start in block 502.

A power loss from a primary power supply to a host system may be detected by a persistent power enabled on-chip data processor, as in block 504. The persistent power enabled on-chip data processor may initiate a transfer of data based on a signal or command from the host system, as in block 506.

Data may be transferred from a volatile memory to a non-volatile memory using a persistent power enabled on-chip data processor upon detecting the power loss from the primary power source, wherein the one or more emergency power supplies are attached to the volatile memory, the non-volatile memory, and the persistent power enabled on-chip data processor to assist with the transferring of data, as in block 508. In one aspect, the volatile memory, the non-volatile memory, and the persistent power enabled on-chip data processor each have their own emergency power supply to provide an independent source of power. The functionality 500 may end, as in block 510.

In one aspect, in conjunction with and/or as part of at least one blocks of FIG. 5, the operations of method 500 may include each of the following. The operations of 500 may process the data by the persistent power enabled on-chip data processor prior to saving the data to the non-volatile memory while receiving temporary power from the one or more emergency power supplies. The operations of 500 may copy and transfer, by the persistent power enabled on-chip data processor, the data from selected regions of the volatile memory for storage in the non-volatile memory based on an instruction such as, for example, the signal or command received from the host system.

The operations of 500 may maintain power to the volatile memory for a selected time period by the one or more emergency power supplies, maintain power to the non-volatile memory for a selected time period by the one or more emergency power supplies, and maintain power to the persistent power enabled on-chip data processor for the selected time period by the one or more emergency power supplies. The selected time period may be predefined, determined, or selected based upon a configuration or type of the one or more emergency power supplies. For example, in one aspect, the selected time period may be a time period of sufficient length to only transfer and save the data. Alternatively, the selected time period may be a time period lasting until power from the one or more emergency power supplies is entirely consumed.

In some embodiments, the operations of 500 may compress, encrypt, and transform the data and selected processor state information, configurations, keys and critical data from the volatile memory to the non-volatile memory by the persistent power enabled on-chip data processor.

In some embodiments, the operations of 500 may maintain power to the non-volatile memory for one or more time periods by the one or more emergency power supplies. In some embodiments, the operations of 500 may maintain power to the volatile memory for the one or more time periods by the one or more emergency power supplies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for using a persistent power enabled on-chip data processor in a computing environment by one or more processors comprising:
   transferring data from a volatile memory to a non-volatile memory using a persistent power enabled on-chip data processor upon detecting a power loss from a primary power source, wherein one or more emergency power supplies are attached to the volatile memory, the non-volatile memory, and the persistent power enabled on-chip data processor to assist with the transferring of data; and
   further including compressing, encrypting, and transforming the data and selected processor state information, configurations, keys and critical data from the volatile memory to the non-volatile memory by the persistent power enabled on-chip data processor.

2. The method of claim 1, further including detecting the power loss by the persistent power enabled on-chip data processor, wherein the one or more emergency power supplies are activated to supply temporary power to the persistent power enabled on-chip data processor, the volatile memory, and the non-volatile memory.

3. The method of claim 1, further including initiating the transferring of the data by the persistent power enabled on-chip data processor based on signal or command from a host system.

4. The method of claim 1, further including copying and transferring, by the persistent power enabled on-chip data processor, the data from selected regions of the volatile memory for storage in the non-volatile memory based on an instruction received from a host system.

5. The method of claim 1, further including:
maintaining power to the volatile memory for one or more time periods by the one or more emergency power supplies; and
maintaining power to the non-volatile memory for the one or more time periods by the one or more emergency power supplies.

6. The method of claim 1, further including processing the data by the persistent power enabled on-chip data processor prior to saving the data to the non-volatile memory while receiving temporary power from the one or more emergency power supplies.

7. A system for using a persistent power enabled on-chip data processor in a computing environment, comprising:
one or more computers with executable instructions that when executed cause the system to:
transfer data from a volatile memory to a non-volatile memory using a persistent power enabled on-chip data processor upon detecting a power loss from a primary power source, wherein one or more emergency power supplies are attached to the volatile memory, the non-volatile memory, and the persistent power enabled on-chip data processor to assist with the transferring of data; and
wherein the executable instructions when executed cause the system to compress, encrypt, and transform the data and selected processor state information, configurations, keys and critical data from the volatile memory to the non-volatile memory by the persistent power enabled on-chip data processor.

8. The system of claim 7, wherein the executable instructions when executed cause the system to detect the power loss by the persistent power enabled on-chip data processor, wherein the one or more emergency power supplies are activated to supply temporary power to the persistent power enabled on-chip data processor, the volatile memory, and the non-volatile memory.

9. The system of claim 7, wherein the executable instructions when executed cause the system to initiate the transferring of the data by the persistent power enabled on-chip data processor based on signal or command from a host system.

10. The system of claim 7, wherein the executable instructions when executed cause the system to copy and transfer, by the persistent power enabled on-chip data processor, the data from selected regions of the volatile memory for storage in the non-volatile memory based on an instruction received from a host system.

11. The system of claim 7, wherein the executable instructions when executed cause the system to:
maintain power to the non-volatile memory for one or more time periods by the one or more emergency power supplies; and
maintain power to the volatile memory for the one or more time periods by the one or more emergency power supplies.

12. The system of claim 7, wherein the executable instructions when executed cause the system to process the data by the persistent power enabled on-chip data processor prior to saving the data to the non-volatile memory while receiving temporary power from the one or more emergency power supplies.

13. A computer program product for using a persistent power enabled on-chip data processor in a computing environment, the computer program product comprising:
one or more computer readable storage media, and program instructions collectively stored on the one or more computer readable storage media, the program instruction comprising:
program instructions to transfer data from a volatile memory to a non-volatile memory using a persistent power enabled on-chip data processor upon detecting a power loss from a primary power source, wherein one or more emergency power supplies are attached to the volatile memory, the non-volatile memory, and the persistent power enabled on-chip data processor to assist with the transferring of data; and
compress, encrypt, and transform the data and selected processor state information, configurations, keys and critical data from the volatile memory to the non-volatile memory by the persistent power enabled on-chip data processor.

14. The computer program product of claim 13, further including program instructions to detect the power loss by the persistent power enabled on-chip data processor, wherein the one or more emergency power supplies are activated to supply temporary power to the persistent power enabled on-chip data processor, the volatile memory, and the non-volatile memory.

15. The computer program product of claim 13, further including program instructions to initiate the transferring of the data by the persistent power enabled on-chip data processor based on signal or command from a host system.

16. The computer program product of claim 13, further including program instructions to:
copy and transfer, by the persistent power enabled on-chip data processor, the data from selected regions of the volatile memory for storage in the non-volatile memory based on an instruction received from a host system.

17. The computer program product of claim 13, further including program instructions to:
maintain power to the non-volatile memory for one or more time periods by the one or more emergency power supplies; and
maintain power to the volatile memory for the one or more time periods by the one or more emergency power supplies.

18. The computer program product of claim 13, further including program instructions to process the data by the persistent power enabled on-chip data processor prior to saving the data to the non-volatile memory while receiving temporary power from the one or more emergency power supplies.

* * * * *